(12) United States Patent
Acharya et al.

(10) Patent No.: US 8,606,858 B1
(45) Date of Patent: Dec. 10, 2013

(54) REMOTE APPLICATION CONTROL

(75) Inventors: Anish Acharya, Toronto (CA); Jeson Patel, Concord (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/415,258

(22) Filed: Mar. 8, 2012

Related U.S. Application Data

(60) Provisional application No. 61/450,261, filed on Mar. 8, 2011.

(51) Int. Cl.
  *G06F 15/16* (2006.01)
(52) U.S. Cl.
  USPC ............................ 709/204; 709/217; 717/171
(58) Field of Classification Search
  USPC ........................... 709/204, 217, 245; 717/171
  See application file for complete search history.

(56) References Cited

U.S. PATENT DOCUMENTS 7,865,888 B1 * 1/2011 Qureshi et al. ................ 717/168
2011/0058523 A1 * 3/2011 Manning et al. .............. 370/329

* cited by examiner

*Primary Examiner* — El Hadji Sall
(74) *Attorney, Agent, or Firm* — Fish & Richardson P.C.

(57) ABSTRACT

Methods, systems, and apparatus, including computer programs encoded on a computer storage medium, for remote application control. In one aspect, a method includes collecting first metrics associated with an application. The method includes receiving a request from a client device. The method includes sending a response, the response comprising instructions to alter the flow of the application. The method includes collecting second metrics associated with the altered application. The method includes comparing the first metrics and the second metrics.

21 Claims, 2 Drawing Sheets

REMOTE APPLICATION CONTROL

CROSS-REFERENCE TO RELATED APPLICATIONS

This application claims priority to U.S. Provisional Application Ser. No. 61/450,261, filed on Mar. 8, 2011, entitled "REMOTE APPLICATION CONTROL."

BACKGROUND

This specification relates to web based applications.

Web applications are accessed by users over a network, for example, the Internet. The applications may be deployed for informational or productivity purposes. Some web applications are transmitted to the client device each time the user wishes to access the application, other web applications install a client portion of the application on the user device (for example, applications on a mobile device).

Some operators of the web applications earn revenue through advertising and/or subscriptions. In general, the more popular the web application, the more revenue is available to the operator.

SUMMARY

This specification describes technologies relating to controlling a remote application. In general, one innovative aspect of the subject matter described in this specification can be embodied in methods that include the action of collecting first metrics associated with an application. Methods also include the action of receiving a request from a client device. Methods also include the action of sending a response, the response comprising instructions to change the behavior of the application. Methods also include the action of collecting second metrics associated with the altered application. Methods also include the action of comparing the first metrics and the second metrics.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The instructions may include instructions to display a message on the client device. The displayed message may include an option to further change the behavior of the application. The instructions may include instructions to alter the value of a variable used by the application. The metrics may include one or more of user retention, user engagement, user driven distribution, and average revenue per user. The response may also include a state associated with the application. The methods may also include the actions of identifying that the client device is to receive instructions to change the behavior of the application.

Particular embodiments of the subject matter described in this specification can be implemented so as to realize one or more of the following advantages. Behavior of applications can be altered. The effects of alterations to programs can be tested.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
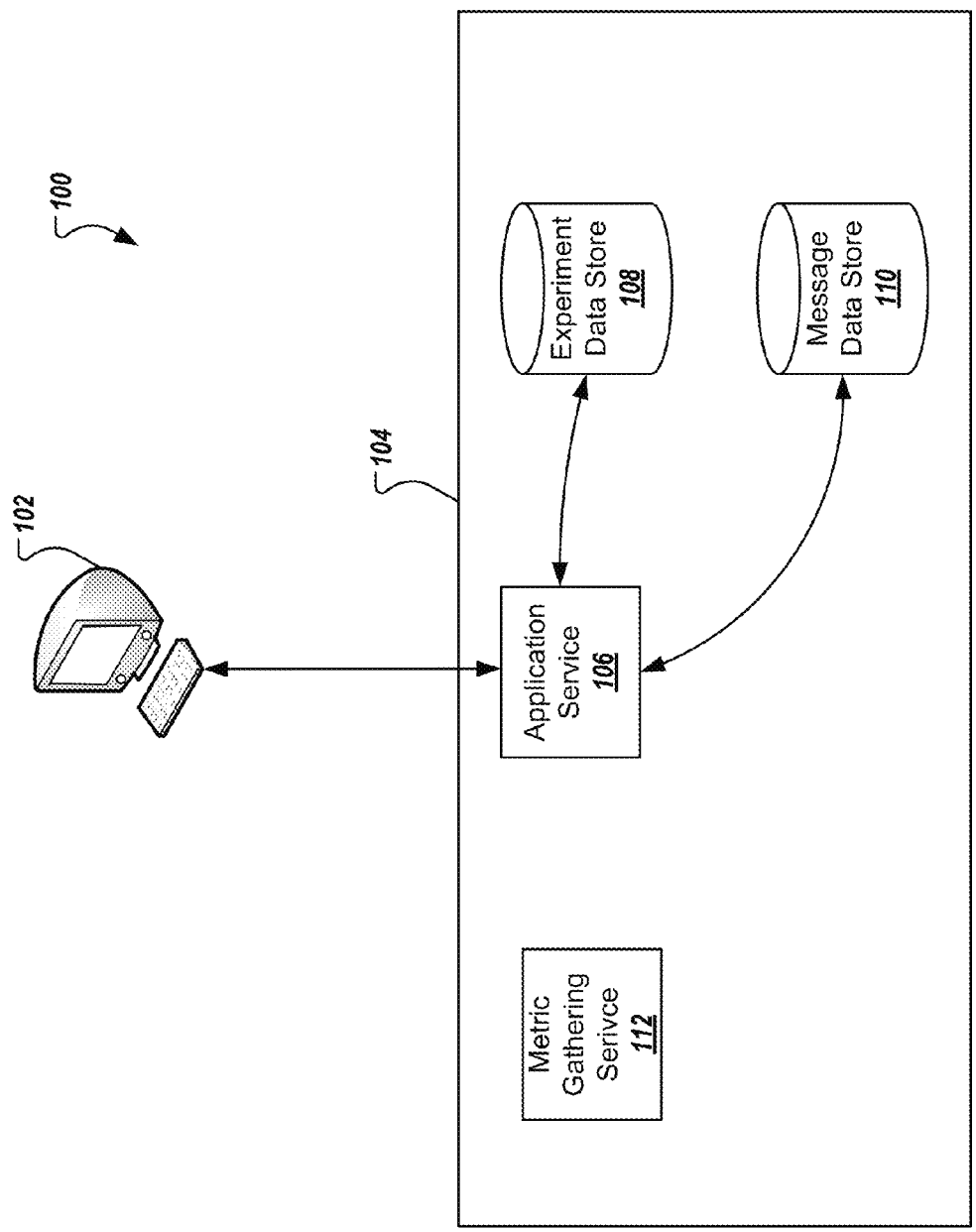
FIG. 1 illustrates an example of a system for remote application control.

FIG. 1 illustrates an example of a system 100 for remote application control. In the system 100, an application running on a user device 102 is tuned for enhanced performance after initial launch. Performance can be measured by identifying and measuring metrics, including but not limited to user retention, user engagement, user-driven distribution (e.g. the number of invitations sent and accepted), and average revenue per user.

Operators of applications can modify the application and measure any change in the metrics. For example, an operator of a web based game may alter a game to present a different message when a user passes a certain level of the game. These experiments can be made such that each user of the web application is presented with the changed application, or such that only a limited number of user's are exposed to the change. The experiments are analyzed to determine if they impact metrics in a positive, negative, or neutral manor.

In implementations, experiments include presenting different messages to the user throughout the course of the application. The presentation of messages can be varied in both the messages (including text, images, etc.) and the time at which the messages appear.

Another experiment example includes varying when the application prompts a user to invite other users to use the application. For example, the application may prompt the user to invite others after 5 minutes instead of 15 minutes. Metrics can be collected and compared, for example, by a metric gathering service 112 executing on a server 104.

The metrics collected during the experiment can be compared to metrics collected at other times to determine if the experiment resulted in an increase of at least one metric.

Web applications without an installed client can operate on a request-response model; that is, a user interaction with a client (for example, a web browser) initiates a request from the client to a server, which returns a response. The response can include information that is then rendered by the browser. The response can include all of the content and layout information to render a view to the user (for example, HTML text).

Since all of the content and layout information is returned in each request, the server can insert a dialog box with arbitrary copy in response to any client request. This dialog box contains messages that could include both informational messages or messages that prompt user action.

Web applications with an installed client on the user device 102 can have the layout determined prior to the installation of the client (for example, during a compilation process). Content is often loaded from a combination of a client source (i.e. content pre-loaded on the user device) and a remote server. In this scenario, content from the server can be dynamically changed, however, content from the client source cannot.

In some implementations, an application service 106 running on the server 104 generates a list of dialog boxes that is returned to a client for display. For example, the application service 106 can check an experiment data store 108 to determine if the user of the client device 102 is part of an experiment. The application service 106 can then access a message data store 110 to select messages that either correspond to the experiment (e.g., user devices executing an altered application) or messages that correspond to a control group (e.g., user devices executing the unaltered application). The application service 106 can return a list of dialog boxes in response to any request from the client (i.e. login, request for content, etc.). The client is responsible for rendering the dialog.

An example of an XML based server request/response is as follows:

Client requests: http://web based game application.com/getGameState?gameId=25
Server responds:
<?xml version="1.0" encoding="UTF-8"?>
<map>
<entry>
<key>response</key>
<value>
<game id="25">
<state>
<![CDATA[<gameState> . . . </gameState>]]>
</state>
</game>
</value>
</entry>
<entry>
<key>remoteDialogs</key>
<value>
<remoteDialogs>
<remoteDialog>
<title>Invite Others</title>
<body>Why not invite someone else to play?</body>
<image>http://web based game application.com/inviteOthers.jpg</image>
<buttons><button>Yes</button><button>No</button></buttons>
<redirectOnYes>inviteOthersPage</redirectOnYes>
<redirectOnNo>dismiss</redirectOnNo>
</remoteDialog>
</remoteDialogs>
</value>
</entry>
</map>

The above response includes both request specific information (the information pertaining to the game referenced by the key response) as well as a list of remote dialog boxes to display (as referenced by the key remoteDialogs). The above response is a single example of how the server provides a general serialization format for responses that contain both the requested response as well as an optional list of dialogs. There are many possible serialization formats that fit this description.

In some implementations, the remote dialog contains a number of fields. The title, body, and image fields are examples of where message content can be inserted in the displayed dialog box. In some implementations, a buttons section describes the buttons that will appear on the dialog box. The flow of the application can be altered based on a user interaction with a dialog button. In the example, if the user clicks "yes" (as defined in the buttons section), then they will be redirected to a page that is known to the client with the alias "inviteOthersPage". If the user clicks "no", the client will dismiss the dialog box (the dismiss alias could be known to the client as a special verb that removes the dialog box from screen).

In some implementations, the server manages dialogs and prepares the dialog to be transmitted over the network (for example, by using conventional serialization techniques). While the example above shows an XML based response, the server could use any number of protocols.

In some implementations, the client component of the system 100 reads an optional list of remote dialogs sent from the server 104 and renders the appropriate view. Furthermore, the user device 102 is responsible for handling any necessary modifications to the layout.

In addition to information describing dialogs, other information can be transmitted along with the response. For example, the response may include instructions to set the values of particular variables that affect the flow of the application, such as a toggle value (e.g. a Boolean true/false value) that puts the application into a debug state. As another example, an application may be offered at a discounted price (or free) with some content blocked, after the user pays a fee, the response may include a toggle value or another variable which alters the flow of the application to allow the user to access a purchased portion of the previously blocked content.

Figure 2:
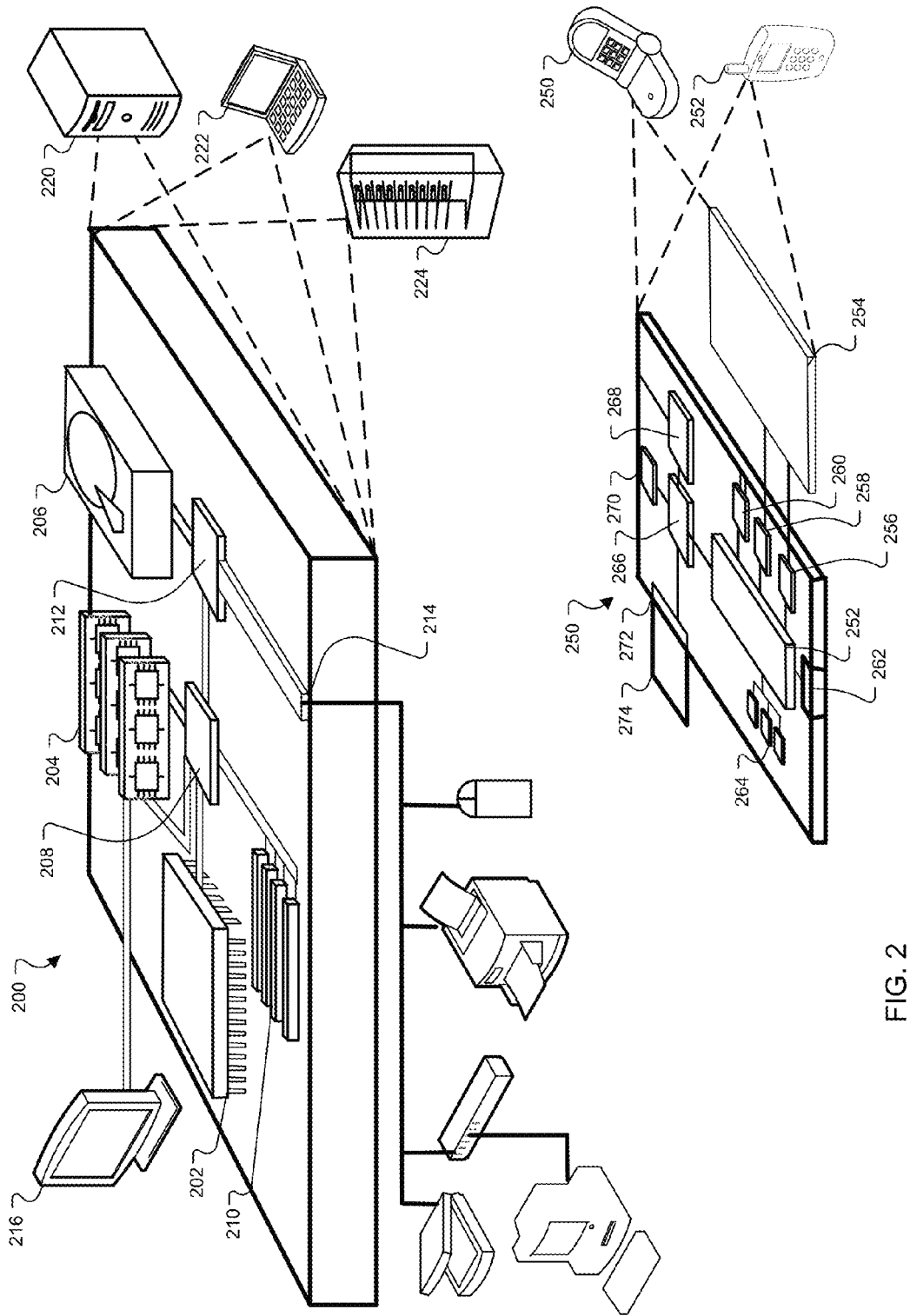
FIG. 2 is a block diagram of computing devices 200, 250 that may be used to implement the systems and methods described in this document, as either a client, a server, or a plurality of servers.

FIG. 2 is a block diagram of computing devices 200, 250 that may be used to implement the systems and methods described in this document, as either a client or as a server or plurality of servers. Computing device 200 is intended to represent various forms of digital computers, such as laptops, desktops, workstations, personal digital assistants, servers, blade servers, mainframes, and other appropriate computers. Computing device 250 is intended to represent various forms of mobile devices, such as personal digital assistants, cellular telephones, smartphones, and other similar computing devices. Additionally computing device 200 or 250 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 200 includes a processor 202, memory 204, a storage device 206, a high-speed interface 208 connecting to memory 204 and high-speed expansion ports 210, and a low speed interface 212 connecting to low speed bus 214 and storage device 206. Each of the components 202, 204, 206, 208, 210, and 212, are interconnected using various busses, and may be mounted on a common motherboard or in other manners as appropriate. The processor 202 can process instructions for execution within the computing device 200, including instructions stored in the memory 204 or on the storage device 206 to display graphical information for a GUI on an external input/output device, such as display 216 coupled to high speed interface 208. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

The memory 204 stores information within the computing device 200. In one implementation, the memory 204 is a volatile memory unit or units. In another implementation, the memory 204 is a non-volatile memory unit or units. The memory 204 may also be another form of computer-readable medium, such as a magnetic or optical disk.

The storage device 206 is capable of providing mass storage for the computing device 200. In one implementation, the storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 204, the storage device 206, or memory on processor 202.

The high speed controller 208 manages bandwidth-intensive operations for the computing device 200, while the low speed controller 212 manages lower bandwidth-intensive operations. Such allocation of functions is exemplary only. In one implementation, the high-speed controller 208 is coupled to memory 204, display 216 (e.g., through a graphics processor or accelerator), and to high-speed expansion ports 210, which may accept various expansion cards (not shown). In the implementation, low-speed controller 212 is coupled to storage device 206 and low-speed expansion port 214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 200 may be implemented in a number of different forms, as shown in the figure. For example, it may be implemented as a standard server 220, or multiple times in a group of such servers. It may also be implemented as part of a rack server system 224. In addition, it may be implemented in a personal computer such as a laptop computer 222. Alternatively, components from computing device 200 may be combined with other components in a mobile device (not shown), such as device 250. Each of such devices may contain one or more of computing device 200, 250, and an entire system may be made up of multiple computing devices 200, 250 communicating with each other.

Computing device 250 includes a processor 252, memory 264, an input/output device such as a display 254, a communication interface 266, and a transceiver 268, among other components. The device 250 may also be provided with a storage device, such as a microdrive or other device, to provide additional storage. Each of the components 250, 252, 264, 254, 266, and 268, are interconnected using various buses, and several of the components may be mounted on a common motherboard or in other manners as appropriate.

The processor 252 can execute instructions within the computing device 250, including instructions stored in the memory 264. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 250, such as control of user interfaces, applications run by device 250, and wireless communication by device 250.

Processor 252 may communicate with a user through control interface 258 and display interface 256 coupled to a display 254. The display 254 may be, for example, a TFT (Thin-Film-Transistor Liquid Crystal Display) display or an OLED (Organic Light Emitting Diode) display, or other appropriate display technology. The display interface 256 may comprise appropriate circuitry for driving the display 254 to present graphical and other information to a user. The control interface 258 may receive commands from a user and convert them for submission to the processor 252. In addition, an external interface 262 may be provide in communication with processor 252, so as to enable near area communication of device 250 with other devices. External interface 262 may provide, for example, for wired communication in some implementations, or for wireless communication in other implementations, and multiple interfaces may also be used.

The memory 264 stores information within the computing device 250. The memory 264 can be implemented as one or more of a computer-readable medium or media, a volatile memory unit or units, or a non-volatile memory unit or units. Expansion memory 274 may also be provided and connected to device 250 through expansion interface 272, which may include, for example, a SIMM (Single In Line Memory Module) card interface. Such expansion memory 274 may provide extra storage space for device 250, or may also store applications or other information for device 250. Specifically, expansion memory 274 may include instructions to carry out or supplement the processes described above, and may include secure information also. Thus, for example, expansion memory 274 may be provide as a security module for device 250, and may be programmed with instructions that permit secure use of device 250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 264, expansion memory 274, or memory on processor 252 that may be received, for example, over transceiver 268 or external interface 262.

Device 250 may communicate wirelessly through communication interface 266, which may include digital signal processing circuitry where necessary. Communication interface 266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 268. In addition, short-range communication may occur, such as using a Bluetooth, WiFi, or other such transceiver (not shown). In addition, GPS (Global Positioning System) receiver module 270 may provide additional navigation- and location-related wireless data to device 250, which may be used as appropriate by applications running on device 250.

Device 250 may also communicate audibly using audio codec 260, which may receive spoken information from a user and convert it to usable digital information. Audio codec 260 may likewise generate audible sound for a user, such as through a speaker, e.g., in a handset of device 250. Such sound may include sound from voice telephone calls, may include recorded sound (e.g., voice messages, music files, etc.) and may also include sound generated by applications operating on device 250.

The computing device 250 may be implemented in a number of different forms, as shown in the figure. For example, it may be implemented as a cellular telephone 280. It may also be implemented as part of a smartphone 282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of social network graphs and methods have been described, it should be recognized that numerous other applications are contemplated. Accordingly, other embodiments are within the scope of the following claims.

What is claimed is:

1. A method performed by data processing apparatus, the method comprising:
receiving a request from a first client device, the request associated with a first application installed on the first client device, the first client device included in a first group;
collecting first metrics associated with the first application from the first client device;
receiving a request from a second client device, the request associated with a second application installed on the second client device, the second application being the same application as the first application;
determining that the second client device belongs to a second group different than the first group;
sending a response to the second client device based on determining that the second client device belongs to the second group, the response comprising instructions to alter the flow of the second application;
collecting second metrics associated with the altered second application from the second client device; and
comparing the first metrics and the second metrics.

2. The method of claim 1, wherein the instructions include instructions to display a message on the second client device.

3. The method of claim 2, wherein the displayed message includes an option to further change the behavior of the second application.

4. The method of claim 1, wherein the instructions include instructions to alter the value of a variable used by the second application.

5. The method of claim 1, wherein the metrics comprise one or more of user retention, user engagement, user driven distribution, and average revenue per user.

6. The method of claim 1, wherein the response further includes a state associated with the second application.

7. The method of claim 1, further comprising identifying that the second client device is to receive instructions to alter the flow of the second application based on determining that the second client device belongs to the second group, wherein sending the response to the second client device is based on identifying that the second client device is to receive instructions to alter the flow of the application.

8. A computer storage device encoded with computer program instructions that when executed by one or more computers cause the one or more computers to perform operations comprising:
receiving a request from a first client device, the request associated with a first application installed on the first client device, the first client device included in a first group;

collecting first metrics associated with the first application from the first client device;

receiving a request from a second client device, the request associated with a second application installed on the second client device, the second application being the same application as the first application;

determining that the second client device belongs to a second group different than the first group;

sending a response to the second client device based on determining that the second client device belongs to the second group, the response comprising instructions to alter the flow of the second application;

collecting second metrics associated with the altered second application from the second client device; and comparing the first metrics and the second metrics.

9. The computer storage device of claim 8, wherein the instructions include instructions to display a message on the second client device.

10. The computer storage device of claim 9, wherein the displayed message includes an option to further change the behavior of the second application.

11. The computer storage device of claim 8, wherein the instructions include instructions to alter the value of a variable used by the second application.

12. The computer storage device of claim 8, wherein the metrics comprise one or more of user retention, user engagement, user driven distribution, and average revenue per user.

13. The computer storage device of claim 8, wherein the response further includes a state associated with the second application.

14. The computer storage device of claim 8, the operations further comprising identifying that the second client device is to receive instructions to change the behavior of the second application based on determining that the second client device belongs to the second group, wherein sending the response to the second client device is based on identifying that the second client device is to receive instructions to alter the flow of the application.

15. A system comprising:
one or more computers and one or more storage devices storing instructions that are operable, when executed by the one or more computers, to cause the one or more computers to perform operations comprising:

receiving a request from a first client device, the request associated with a first application installed on the first client device, the first client device included in a first group;

collecting first metrics associated with the first application from the first client device;

receiving a request from a second client device, the request associated with a second application installed on the second client device, the second application being the same application as the first application;

determining that the second client device belongs to a second group different than the first group;

sending a response to the second client device based on determining that the second client device belongs to the second group, the response comprising instructions to alter the flow of the second application;

collecting second metrics associated with the altered second application from the second client device; and comparing the first metrics and the second metrics.

16. The system of claim 15, wherein the instructions include instructions to display a message on the second client device.

17. The system of claim 16, wherein the displayed message includes an option to further change the behavior of the second application.

18. The system of claim 15, wherein the instructions include instructions to alter the value of a variable used by the second application.

19. The system of claim 15, wherein the metrics comprise one or more of user retention, user engagement, user driven distribution, and average revenue per user.

20. The system of claim 15, wherein the response further includes a state associated with the second application.

21. The system of claim 15, the operations further comprising identifying that the second client device is to receive instructions to alter the flow of the second application based on determining that the second client device belongs to the second group, wherein sending the response to the second client device is based on identifying that the second client device is to receive instructions to alter the flow of the application.

* * * * *